US009789651B2

(12) United States Patent
Musuvathy et al.

(10) Patent No.: US 9,789,651 B2
(45) Date of Patent: Oct. 17, 2017

(54) METHOD FOR STRUCTURE PRESERVING TOPOLOGY OPTIMIZATION OF LATTICE STRUCTURES FOR ADDITIVE MANUFACTURING (71) Applicant: Siemens Product Lifecycle Management Software Inc., Plano, TX (US)

(72) Inventors: Suraj Ravi Musuvathy, Glenmont, NY (US); Erhan Arisoy, Pittsburgh, PA (US)

(73) Assignee: SIEMENS PRODUCT LIFECYCLE MANAGEMENT SOFTWARE, INC., Plano, TX (US)

( * ) Notice: Subject to any disclaimer, the term of this patent is extended or adjusted under 35 U.S.C. 154(b) by 347 days.

(21) Appl. No.: 14/591,395

(22) Filed: Jan. 7, 2015

(65) Prior Publication Data

US 2015/0190971 A1    Jul. 9, 2015

Related U.S. Application Data (60) Provisional application No. 61/925,362, filed on Jan. 9, 2014, provisional application No. 61/948,157, filed on Mar. 5, 2014.

(51) Int. Cl.
G06F 17/50     (2006.01)
B29C 67/00     (2017.01)
B33Y 50/02     (2015.01)

(52) U.S. Cl.
CPC .......... *B29C 67/0088* (2013.01); *B33Y 50/02* (2014.12); *G06F 17/50* (2013.01)

(58) Field of Classification Search
CPC . B29C 67/0088; B29C 67/0051; B33Y 50/02; G06F 17/50

(Continued)

(56) References Cited

U.S. PATENT DOCUMENTS

2010/0262406 A1* 10/2010 Goel ................... G06F 17/5018
                                                                    703/2
2011/0270587 A1    11/2011 Yamada et al.
(Continued)

FOREIGN PATENT DOCUMENTS

CN    101859332 A    10/2010
CN    102760183 A    10/2012
(Continued)

OTHER PUBLICATIONS

Bern, M. and Eppstein, D. "Mesh generation and optimal triangulation." Computing in Euclidean geometry 1 (1992), pp. 23-90. (78 pages).

(Continued)

*Primary Examiner* — Mark Connolly (57) ABSTRACT

Methods for structure preserving topology optimization of lattice structures for additive manufacturing. A method includes receiving an initial lattice model, a physical objective of the initial lattice model to be optimized, forces to be applied to the initial lattice model and their respective locations, and an optimal volume ratio for an optimized lattice model, computing a bounding box of the initial lattice model and an axis-aligned voxel grid, computing an implicit scalar field representation of an initial volume ratio of the initial lattice model, mapping the loads to their respective locations in the axis-aligned voxel grid, performing an additive topology optimization on the initial lattice model to create the optimized lattice model until the initial volume ratio satisfies the optimal volume ratio, and storing the optimized lattice model.

20 Claims, 9 Drawing Sheets (58) Field of Classification Search
USPC .......................................................... 700/98
See application file for complete search history.

(56) References Cited

U.S. PATENT DOCUMENTS

| | | | |
|---|---|---|---|
| 2012/0058174 A1 | 3/2012 | West et al. | |
| 2014/0363481 A1 | 12/2014 | Pasini et al. | |
| 2015/0219444 A1* | 8/2015 | Bamberg | B29C 67/0088 419/55 |
| 2015/0360288 A1* | 12/2015 | Zalewski | B22F 3/1055 419/38 |
| 2016/0001509 A1* | 1/2016 | Long | B29C 67/0092 700/98 |
| 2016/0136896 A1* | 5/2016 | Wighton | B29C 67/0088 700/120 |

FOREIGN PATENT DOCUMENTS

| | | |
|---|---|---|
| CN | 103495731 A | 1/2014 |
| JP | 2002189760 A | 7/2002 |
| WO | 2013020901 A1 | 2/2013 |

OTHER PUBLICATIONS

Chen, Y. "3d texture mapping for rapid manufacturing." Computer-Aided Design & Applications vol. 4, 6 (2007), pp. 761-771. (10 pages).

Chen, Y. and Wang, C.C. "Regulating complex geometries using layered depth-normal images for rapid prototyping and manufacturing." Rapid Prototyping Journal vol. 19, 4 (2013), pp. 253-268. (27 pages).

Hussein, A., et al. "Advanced lattice support structures for metal additive manufacturing." Journal of Materials Processing Technology (2013), 8 pages.

Jones, M.W., et al. "3d distance fields: A survey of techniques and applications." IEEE Transactions on Visualization and Computer Graphics, vol. 12, 4 (2006), pp. 581-599. (23 pages).

Lorensen, W.E., et al. "Marching cubes: A high resolution 3d surface construction algorithm." in ACM Siggraph Computer Graphics (1987), vol. 21, ACM, pp. 163-169. (13 pages).

Masood, S.H. and Alamara, K. "Development of scaffold building units and assembly for tissue engineering using fused deposition modelling." Advanced Materials Research vol. 83 (2010), 269-274. (6 pages).

Pasko, A., et al. "Procedural function-based modelling of volumetric microstructures." Graphical Models vol. 73, 5 (2011), 165-181. (19 pages).

Pasko, A., et al. "Procedural function-based spatial microstructures." in Shape Modeling International Conference (SMI), (2010), IEEE, pp. 47-56. (17 pages).

Sederberg, T.W., et al. "Watertight trimmed NURBS." in ACM Transactions on Graphics (TOG) (2008), vol. 27, ACM, 8 pages.

Strano, G., et al. "A new approach to the design and optimisation of support structures in additive manufacturing." The International Journal of Advanced Manufacturing Technology (2013), pp. 1-8. (9 pages).

Wang, H., et al. "A hybrid geometric modeling method for large scale conformal cellular structures." in ASME 7 Computers and Information in Engineering Conference, Long Beach, California (2005), 13 pages.

Wang, H., et al. "Parametric modeling method for truss structures," in ASME Computers and Information in Engineering Conference (2002), 9 pages.

Yan, C., et al. "Evaluations of cellular lattice structures manufactured using selective laser melting." International Journal of Machine Tools and Manufacture vol. 62 (2012), pp. 32-38. (7 pages).

Bendsoe, M.P. and Kikuchi, N. "Generating optimal topologies in structural design using a homogenization method." Computer Methods in Applied Mechanics and Engineering vol. 71, 2 (1988), pp. 197-224. (28 pages).

Challis, V.J. "A discrete level-set topology optimization code written in matlab." Structural and Multidisciplinary Optimization vol. 41, 3 (2010), 453-464. (12 pages).

Chu, C., et al. "Design for additive manufacturing of cellular structures." Computer-Aided Design and Applications vol. 5, 5 (2008), 686-696. (12 pages).

Rozvany, G.I.N. "A critical review of established methods of structural topology optimization." Structural and Multidisciplinary Optimization vol. 31, 3 (2009), pp. 217-237. (21 pages).

Sethian, J. A., and Wiegmann, A. "Structural boundary design via level set and immersed interface methods." Journal of Computational Physics vol. 163, 2 (2000), pp. 489-528. (38 pages).

Suzuki, K. and Kikuchi, N. "A homogenization method for shape and topology optimization." Computer Methods in Applied Mechanics and Engineering vol. 93, 3 (1991), pp. 291-318. (28 pages).

Wang, M.Y., et al. "A level set method for structural topology optimization." Computer Methods in Applied Mechanics and Engineering vol. 192, 1 (2003), pp. 227-246. (20 pages).

Wang, C.C.L. and Chen, Y. "Layered Depth-Normal Images: a Sparse Implicit Representation of Solid Models." Layered depth-normal images: A sparse implicit representation of solid models. arXiv preprint arXiv:1009.0794, Sep. 2010, 27 pages.

Stava, O., et al. "Stress relief: improving structural strength of 3d printable objects." ACM Transactions on Graphics (TOG), vol. 31(4), 2012, 11 pages.

Chinese office action dated Nov. 28, 2016, for CN Application No. 201580004025.1, 5 pages.

Jason Nguyen et al., "Heuristic optimization method for cellular structure design of light weight components", International Journal of precision Engineering and Manufacturing, vol. 14, Issue 6, pp. 1071-1078, Jun. 19, 2013 / Jun. 19, 2013, 7 pages.

Jason Nguyena et al., "Conformal Lattice Structure Design and Fabrication", Laboratory for Freeform Fabrication, 2012, section 1.3, 24 pages.

Uma Maheshwaraa et al., "Design and freeform fabrication of deployable structures with lattice skins." Rapid prototyping Journal. vol. 13. Issue 4. pp. 213-225, 2007, pp. 7-8, 16, 14 pages.

B. Vayre et al., "Designing for Additive Manufacturing". 45th CIRP Conference on Manufacturing, Systems 2012, vol. 3, pp. 632-637, 2012, 6 pages.

PCT Search Report mailed Apr. 13, 2015, for Application No. PCT/US2015/010686, 10 pages.

Luo Zhen "A Short Survey: Topological Shape Optimization of Structures Using Level Set Methods" School of Electrical, Mechanical and Mechatronic Systems, The University of Technology, Sydney, NSW 2007, Australia Applied Mechanical Engineering, vol. 2, No. 3, Jan. 1, 2013 XP055391204.

\* cited by examiner

METHOD FOR STRUCTURE PRESERVING TOPOLOGY OPTIMIZATION OF LATTICE STRUCTURES FOR ADDITIVE MANUFACTURING

CROSS-REFERENCE TO OTHER APPLICATION

This application claims the benefit of the filing date of U.S. Provisional Patent Application 61/925,362, filed Jan. 9, 2014, which is hereby incorporated by reference.

This application claims the benefit of the filing date of U.S. Provisional Patent Application 61/948,157, filed Mar. 5, 2014, which is hereby incorporated by reference.

This application shares some subject matter with commonly-assigned, concurrently filed U.S. patent application Ser. No. 14/591,320 filed Jan. 7, 2015 for "Method for Creating Three Dimensional Lattice Structures in Computer-Aided Design Models for Additive Manufacturing", which is hereby incorporated by reference.

TECHNICAL FIELD

The present disclosure is directed, in general, to additive manufacturing and more particularly to a system and method for performing additive manufacturing using lattice models.

BACKGROUND OF THE DISCLOSURE

Additive manufacturing enables fabrication of products with complex internal lattice structures, which are repeated arrangements of shapes in a grid-like pattern or other pattern of repeated shapes that replace a solid volume. A lattified part is defined as a part where a portion of the volume has been replaced with an appropriate lattice that consists of a pattern of cell shapes.

SUMMARY OF THE DISCLOSURE

Various disclosed embodiments include methods for structure preserving topology optimization of lattice structures for additive manufacturing. A method includes receiving an initial lattice model, a physical objective of the initial lattice model to be optimized, forces to be applied to the initial lattice model and their respective locations, and an optimal volume ratio for an optimized lattice model, computing a bounding box of the initial lattice model and an axis-aligned voxel grid, computing an implicit scalar field representation of an initial volume ratio of the initial lattice model, mapping the loads to their respective locations in the axis-aligned voxel grid, performing an additive topology optimization on the initial lattice model to create the optimized lattice model until the initial volume ratio satisfies the optimal volume ratio, and storing the optimized lattice model.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Additive manufacturing enables fabrication of parts with complex internal lattice structures with free-form organic shapes. Lattice is defined to mean a geometric and topological manifestation of a repeated pattern of cell shapes that replace a solid internal volume. Such parts are difficult or impossible to be fabricated with other conventional manufacturing processes such as subtractive computer numerical control (CNC) or formative molding type processes. Described is the optimization of initially defined lattice structures with the goal of modifying the shape and topology of these initial lattices to improve engineering objectives with respect to certain constraints and requirements via material addition and removal while preserving initial structure.

A primary need for lattices is motivated by the desire to create functional parts with high structural strength accompanied by low mass. Additionally, lattified parts can also provide enhanced energy absorption characteristics in order to dampen shocks or vibrations. Similarly, for parts that are used in high temperature operating environments such as engines and turbines, lattices can provide enhanced internal cooling by possessing an increased effective surface area available for heat transfer. Although these examples focus on the optimization of engineering functionality, lattified parts also provide other advantages realized through raw material and manufacture time savings as lesser material is required, and as a result savings in energy utilization of manufacturing machines. For example, lighter moving parts require less driving physical forces and torques and therefore consume less energy during operation resulting in more sustainable and green product designs. However, in most of these application scenarios, it is crucial to combine the know-how experience with mathematical optimization results in order to reach an optimal lattice structure. The approaches described enable the preservation of some of the design decisions inherited from industry experience while optimizing lattice structure according to engineering constraints. Lattices can also be used to optimize the additive manufacturing process itself through optimal support structure designs.

Topology optimization exists in several application areas, the most common is for optimizing the minimum structural compliance problem to produce light-weight objects. Categories for optimizing the minimum structural compliance problem to produce light-weight objects include: (1) density-based techniques, (2) level-set methods and (3) heuristics. The first category includes density based techniques such as homogenization methods and solid isotropic microstructure with penalty technique. The main motivation for these techniques is optimizing material distribution via additive or subtractive operations in order to satisfy user-provided engineering constraints while minimizing compliance problems. The material removal or addition decisions are made according to the calculated shape derivatives at every step of the optimization. However, this term only enabled addition or removal operations on the boundary. To alleviate this drawback, the second category focuses on utilization of deformable level-sets to represent the underlying topology for the optimization of the compliance problem. The use of deformable level-set techniques enabled initialization of new holes dictated by topology derivatives inside the geometry at any optimization step. In addition to these categories, heuristic approaches are proposed in order to alleviate the nature of the topology optimization problem with stress and buckling constraints. However, the execution time of these methods varies from case to case based on the initialization that hinders their application on large scale problems.

These approaches are directed towards removing material rather than adding it. Detailed embodiments allow a user to specify an initial lattice grid that can then grow and shrink appropriately to produce optimized lattice structures while preserving initial structure using improved level-set processes.

Disclosed processes for creating free-form lattice structures not only calculate an optimum topology satisfying physical constraints, but also preserves the initial user-provided lattice structure. The system takes as input a free-form object with an internal lattice structure and desired engineering constraints, such as boundary conditions and total volume, converts the input into a level-set formulation, and performs a sequence of topology optimization. This level-set based optimization technique minimizes an engineering function, such as displacements or stresses, required to reach optimal lattice while preserving initial structure via material addition and removal.

By using implicit volume data representations and methods, the presented method simplifies surface geometry and topology updates during optimization. The disclosed method provides a significant technical advantage in that the volume mesh required for finite element analysis has to be generated only once, only requiring the material properties to be updated in every iteration. Therefore the disclosed processes avoid complicated and time consuming volume mesh generation steps for finite element analysis.

Figure 1:
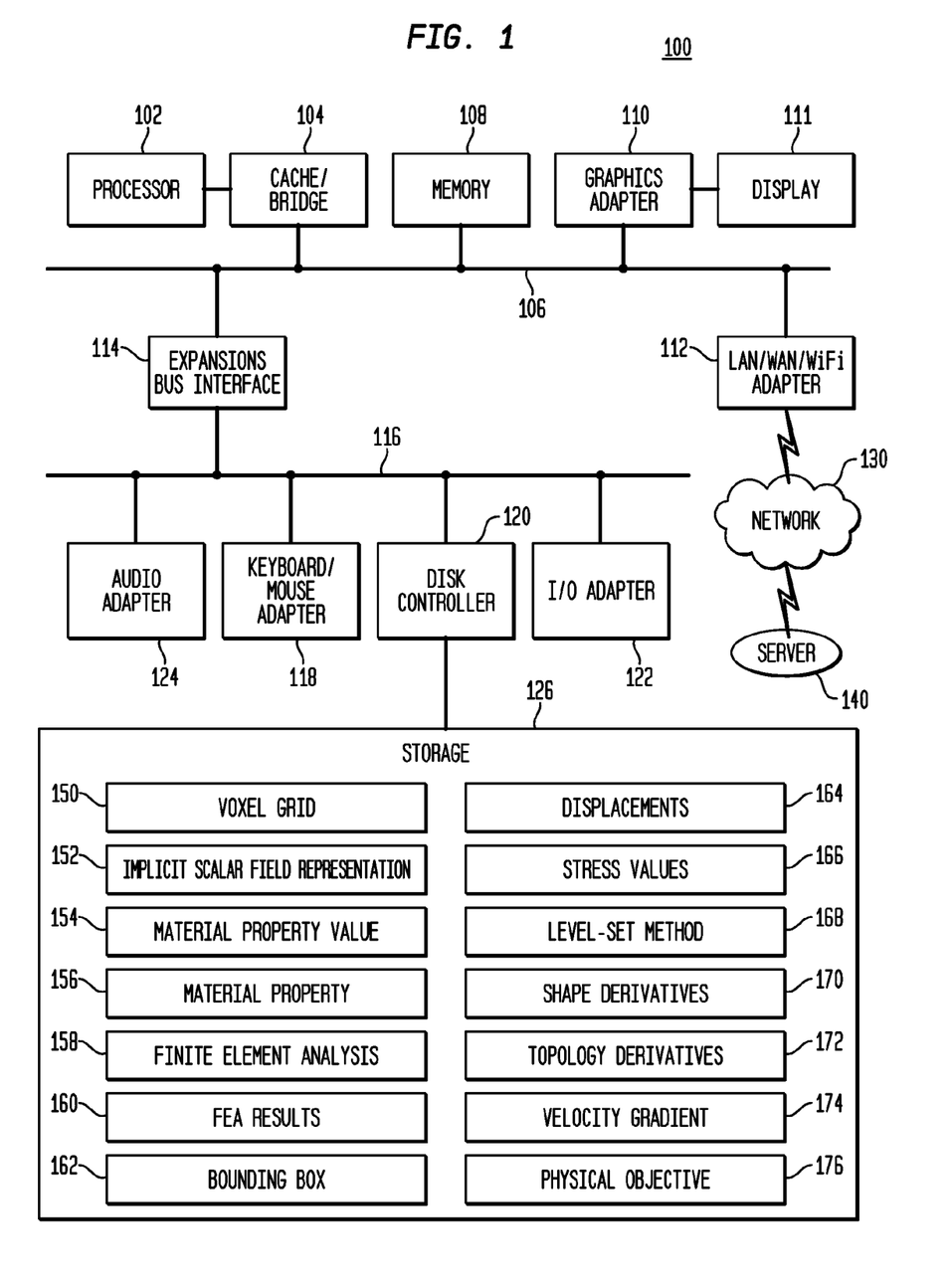
FIG. 1 illustrates a block diagram of a data processing system in which an embodiment can be implemented.

FIG. 1 illustrates a block diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices. The storage 126 stores a voxel grid 150, an implicit scalar field representation 152, material property values 154, material properties 156, finite element analysis (FEA) 158, the FEA results 160, the bounding box 162, the displacements 164, the stress values 166, the level-set method 168, the shape derivatives 170, the topology derivatives 172, the velocity gradients 174, the physical objective 176, and so on, which are described below.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Figure 2A:
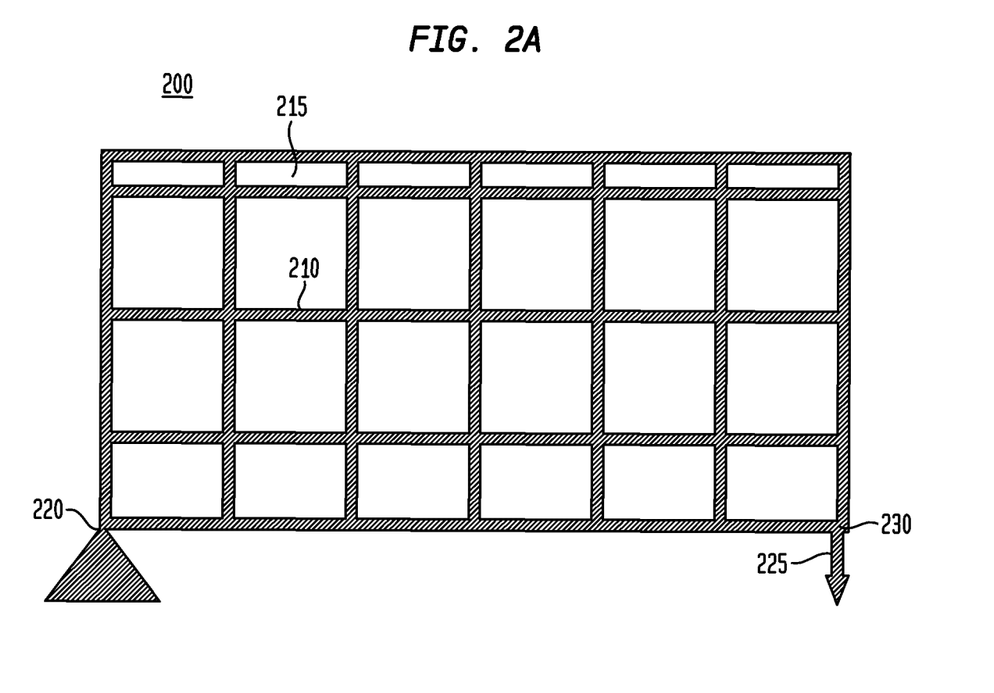
FIG. 2A illustrates a two dimensional (2D) initial lattice model according to disclosed embodiments.
Figure 2B:
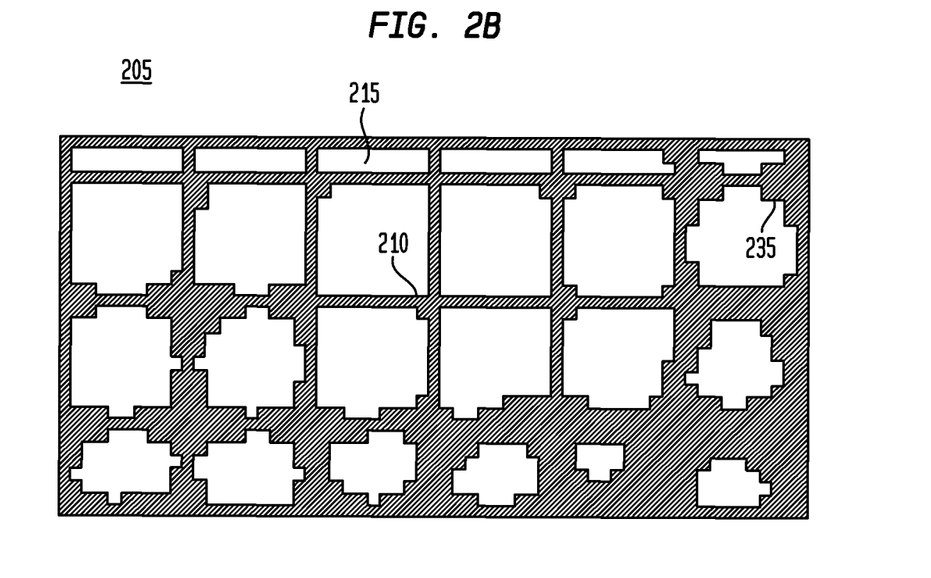
FIG. 2B illustrates a 2D optimized lattice model according to disclosed embodiments.

FIG. 2A illustrates a two dimensional (2D) initial lattice model 200 according to disclosed embodiments. FIG. 2B illustrates a 2D optimized lattice model 205 according to disclosed embodiments, corresponding to the initial lattice model 200. In this embodiment, the initial lattice model 200 is illustrated as a rectangular grid with different spacing in x and y directions. The solid regions 210 are represented in black and the void regions 215 are represented in white color. Boundary conditions for typical use of the product are incorporated for maximizing a physical objective 176 of the object. The physical objective 176 can be selected by a user or determined based on use of the object. For example, a bracket needs displacements 164 and stress values 166 minimized. Other examples of physical objectives 176 include minimizing torque, strain, vibration, etc.

In the illustrated embodiment, the boundary conditions include a support contact point 220 at the lower left corner of the initial lattice model 200 and a force 225 with magnitude of 10 N applied at its respective location 230, the lower right corner, of the initial lattice model 200. The physical objective 176 is tested for the boundary conditions applied to the initial lattice model 200 to create an intermediate lattice model with additional lattice material 235 is applied in a manner to optimally impact the physical objective 176. The intermediate lattice model is then reset into the original rectangular grid with the additional lattice material 235 applied and the physical objective 176 is tested for the boundary conditions applied to an intermediate lattice model. Each iteration of the intermediate lattice models are retested for the boundary conditions until the physical objective 176 is satisfied as the optimized lattice model 205.

The optimized lattice model 205 of the topology optimization method is illustrated in FIG. 2B. A significant difference of this approach is optimizing the physical objective function, in this example corresponding to minimizing displacements 164, while staying true to the initial lattice model 200. Employing a regular level-set based topology optimization scheme, instead of using the disclosed techniques, would erase all user provided lattice information and initiate a lattice from scratch, which only optimizes displacements 164, without necessarily staying true to the initial lattice model 200.

Figure 3A:
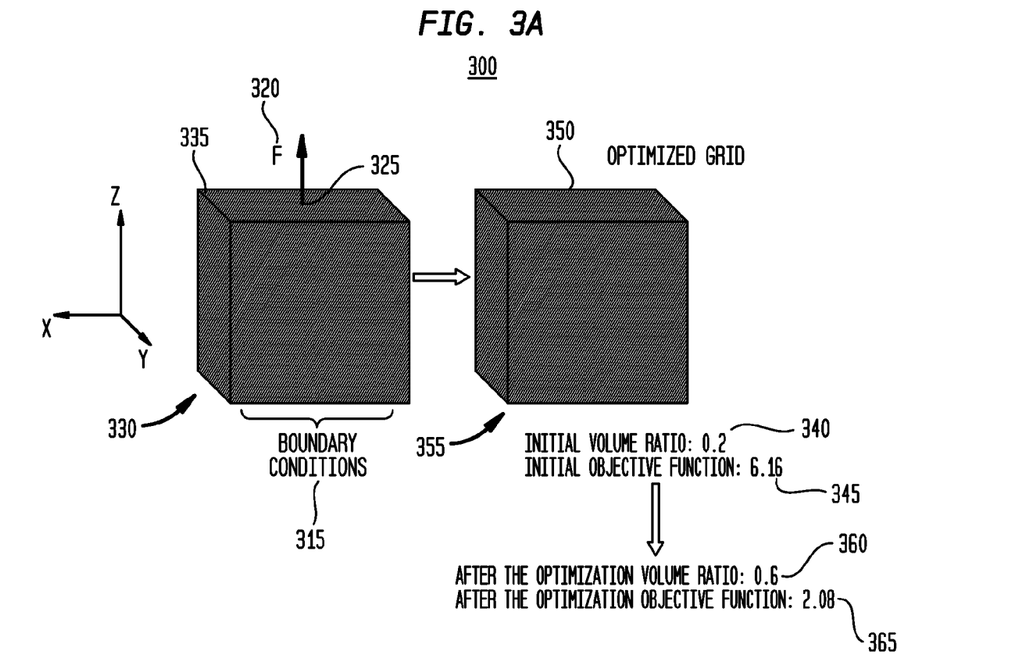
FIGS. 3A, 3B, and 3C illustrate three dimensional (3D) examples of additive topology optimizations with different boundary conditions according to disclosed embodiments.
Figure 3B:
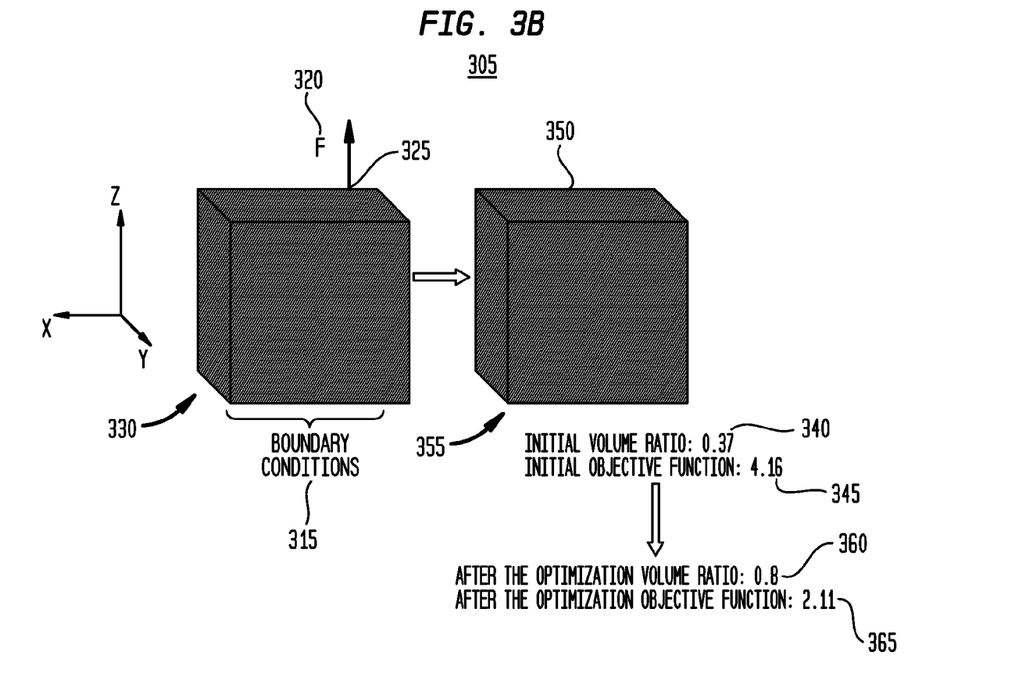
Figure 3C:
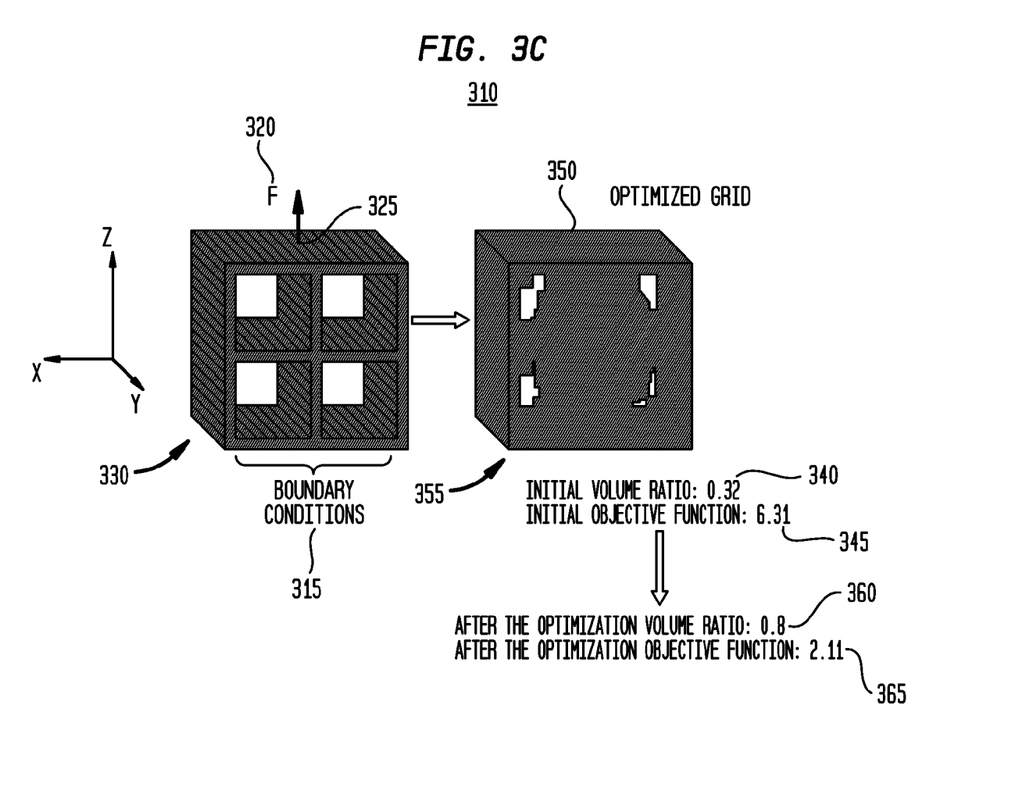

FIGS. 3A, 3B, and 3C illustrate three dimensional (3D) examples of additive topology optimizations with different boundary conditions 315 according to disclosed embodiments. FIG. 3A illustrates an additive topology optimization 300 with a force 320 applied at the center of the top surface, the respective location 325. The initial lattice model 330 is provided with a lattice structure 335 and boundary conditions 315. The provided boundary conditions 315, for this example, are a fixed bottom surface of the initial lattice model 330 and a force 320 applied at the center of the top surface of the initial lattice model 330. The initial lattice model 330 is structured with an initial volume ratio 340 of 0.2 and an initial objective value 345 of 6.16. After 20 iterations, the additive topology optimization 300 creates an optimal structure 350 of the optimal lattice model 355 with an optimal volume ratio 360 of 0.6 and an optimal objective value 365 of 2.08. This result is different compared to the optimal result obtained using the regular level-set based topology optimization scheme, because of the preservation of the lattice structure 335 for the initial lattice model 330. Changing the position of the applied force 320, increases the effect of the change in the optimal structure 350 in the presented method.

FIG. 3B illustrates an additive topology optimization 305 with a force 320 applied at the top right corner of the top surface, the respective location 325. The provided boundary conditions 315, for this example, are a fixed bottom surface of the initial lattice model 330 and a force 320 applied at the top right of the top surface of the initial lattice model 330. The initial lattice model 330 is structured with an initial volume ratio 340 of 0.37 and an initial objective value 345 of 4.16. After 20 iterations, the additive topology optimization 305 creates an optimal structure 350 of the optimal lattice model 355 with an optimal volume ratio 360 of 0.8 and an optimal objective value 365 of 2.11. Moving the applied force 320 closer to the right top corner of the initial lattice model 330, focuses the application of the additional lattice material to the regions closer to that corner.

FIG. 3C illustrates an additive topology optimization 310 structured with an alternate initial lattice model 330 and a force 320 applied at the center of the top surface, the respective location 325. The provided boundary conditions 315, for this example, are a fixed bottom surface of the initial lattice model 330 and a force 320 applied at the center of the top surface of the initial lattice model 330. The initial lattice model 330 is structured with an initial volume ratio 340 of 0.32 and an initial objective value 345 of 6.31. After 20 iterations, the additive topology optimization 310 creates an optimal structure 350 of the optimal lattice model 355 with an optimal volume ratio 360 of 0.8 and an optimal objective value 365 of 2.11. The additive topology optimization 310 made the support structure thicker in order to compensate the effect of the applied force for minimizing the displacements 164.

Figure 4:
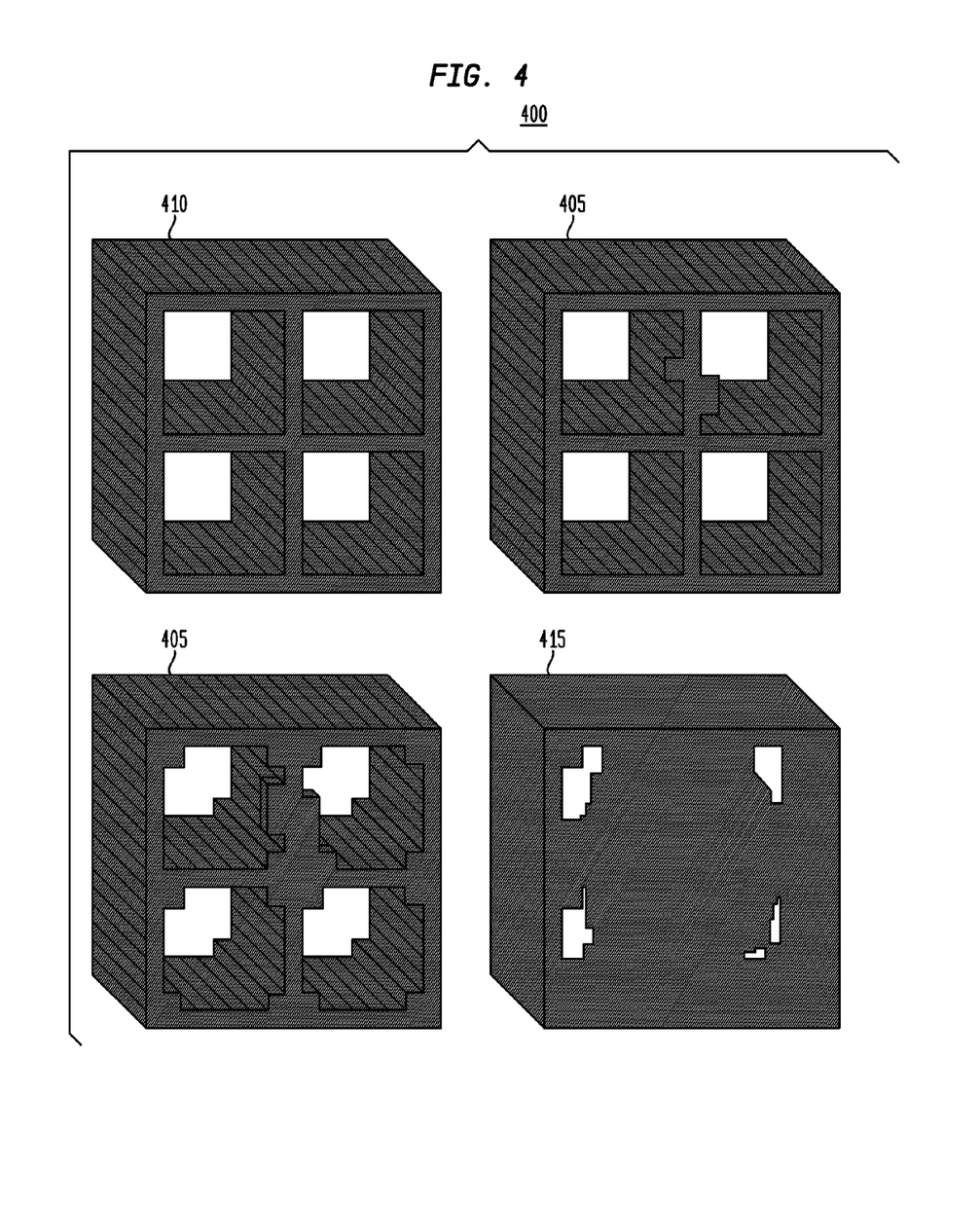
FIG. 4 illustrates a topology optimization method with intermediate lattice models according to disclosed embodiments.

FIG. 4 illustrates a topology optimization method 400 with intermediate lattice models 405 according to disclosed embodiments. Initial finite element analysis (FEA) results 160 provide where the maximum displacements 164 are obtained for the topology optimization method 400 in the initial lattice model 410. The topology optimization method 400 identifies necessary locations in the lattice structure to add material in order to decrease amount of the displacements 164 for each intermediate lattice model 405 and the optimized lattice model 415. For example, some void regions close to the center beam are converted into solid regions in every intermediate lattice model 405 and the optimized lattice model 415.

Figure 5A:
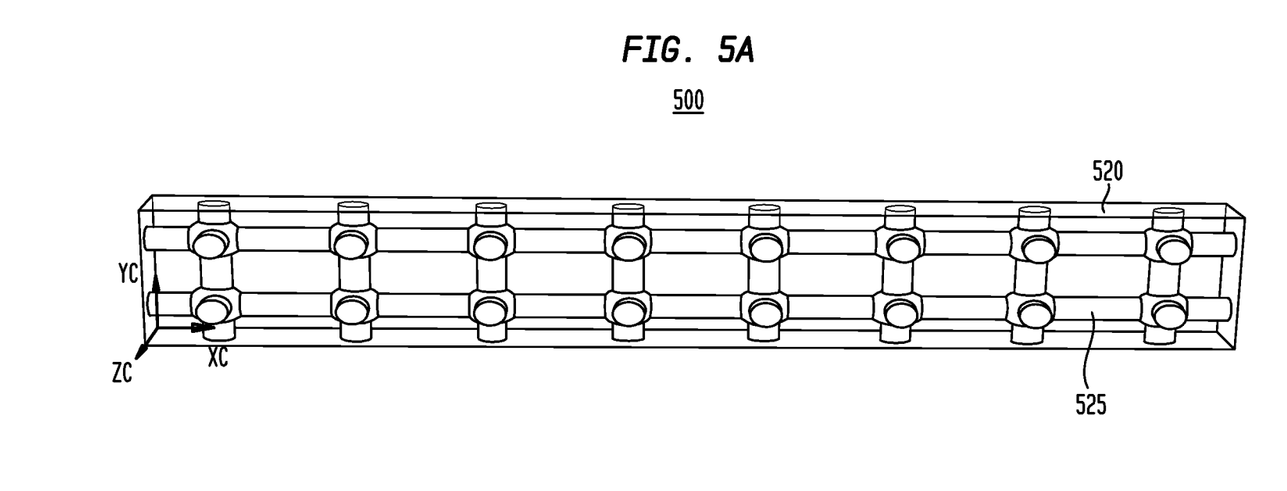
FIGS. 5A-5D illustrate an finite element analysis of a lattice in accordance with disclosed embodiments.
Figure 5B:
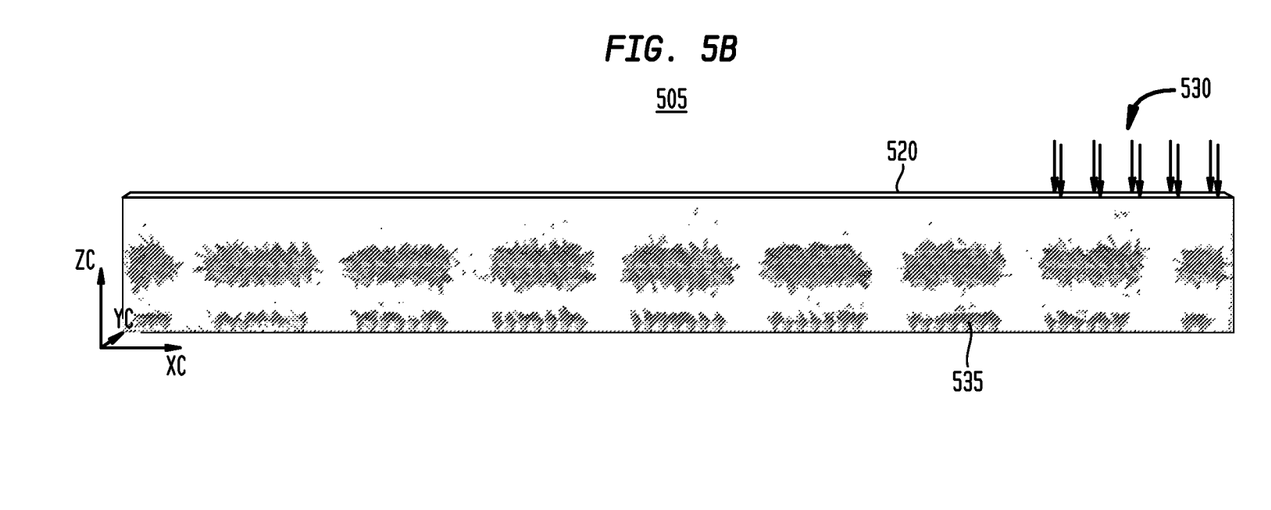
Figure 5C:
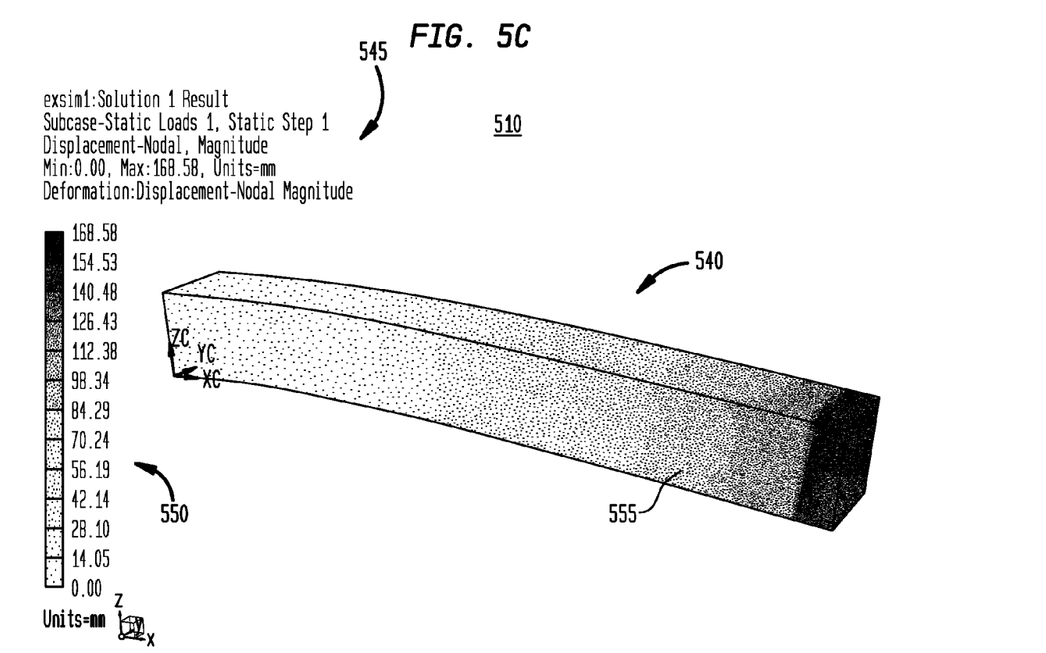
Figure 5D:
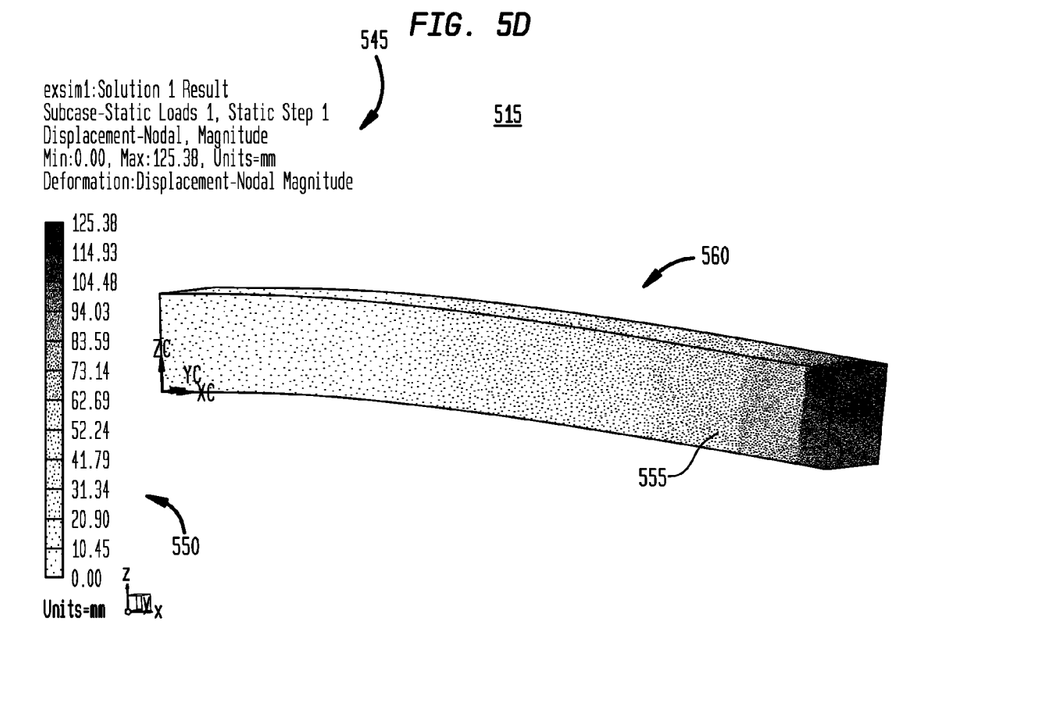

FIGS. 5A-5D illustrate a finite element analysis 158 of a lattice in accordance with disclosed embodiments. FIG. 5A illustrates an initial lattice 500 inside a bounding box 520 in accordance with disclosed embodiments. The initial lattice 500 illustrated is structured as a beam lattice 525. FIG. 5B illustrates an finite element method (FEM) model 505 of an optimization of the initial lattice 500 based on the finite element analysis results 160 in accordance with disclosed embodiments. The initial lattice 500 is fixed on the left side and forces 530 are applied on the right side of the top portion of the initial lattice 500. The forces 530 displace the right side of the initial lattice 500 causing the initial lattice 500 to bend. Additional material 535 is applied to the initial lattice 500 at the locations in the bounding box 520 determined by the finite element analysis 158 to reduce or minimize the amount of displacement 164, while maintaining an optimal volume ratio. FIG. 5C illustrates an initial lattice simulation 510 with a finite element analysis 158 of a simulated lattice 540 in accordance with disclosed embodiments. In the illustrated embodiment, the finite element analysis results 545 indicate the displacements 550 on the simulated lattice 540 for each voxel 555 and are used in applying the additional material to the initial lattice 500. FIG. 5D illustrates an optimal lattice simulation 515 with a finite element analysis 158 of the simulated optimal lattice 560 in accordance with disclosed embodiments. The simulated optimal lattice 560 has amount of additional material 535 applied for an optimal volume ratio in the locations for optimal reduction of displacement 550 of the voxels 555. The finite element analysis results 545 indicate the displacements 550 of the voxels 555 for the simulated optimal lattice 560.

Figure 6:
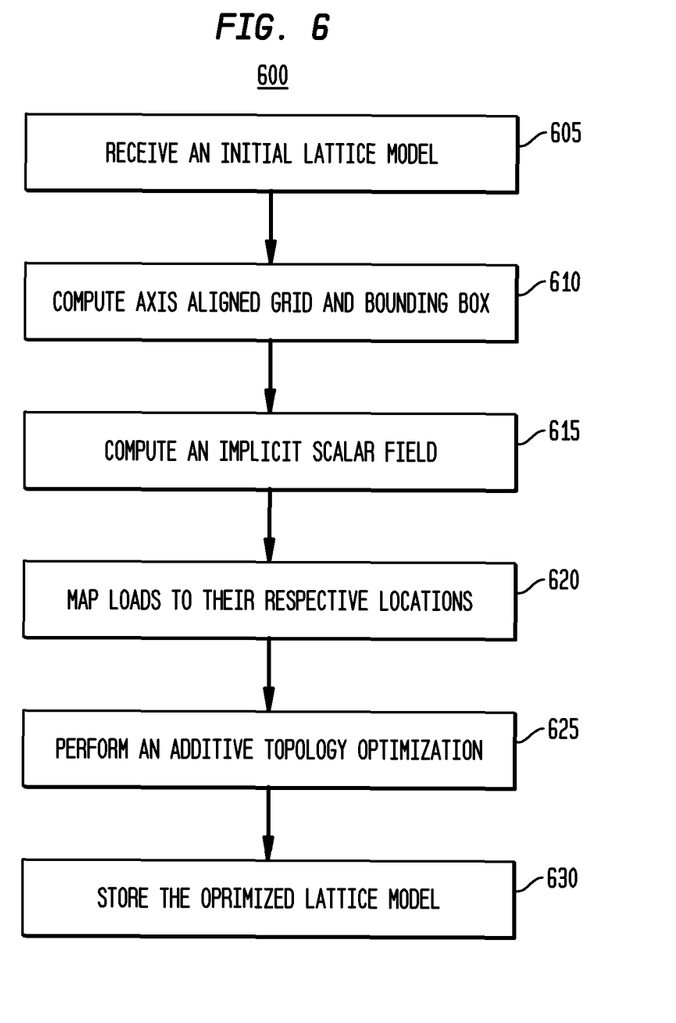
FIG. 6 depicts a flowchart of a topology optimization process in accordance with disclosed embodiments that may be performed, for example, by a product lifecycle management (PLM) or product data management (PDM) system.

FIG. 6 depicts a flowchart of a topology optimization process 600 in accordance with disclosed embodiments that may be performed, for example, by a PLM or PDM system.

In step 605, the system receives an initial lattice model, a physical objective 176 of the initial lattice model, loads to be applied to the initial lattice model and their respective locations, and a volume requirement for an optimized lattice model. In certain embodiments, a user creates an initial lattice model by hollowing out certain regions and filling it with a desired lattice structure. The user also specifies a physical objective 176 to be optimized, such as, a minimum structural compliance, any loads with their respective locations to be applied on the model, and a volume requirement for the optimized lattice model.

In step 610, the system computes a bounding box 162 of the initial lattice model and an axis-aligned voxel grid 150. The voxel grid 150 divides the area of the bounding box 162 into a plurality of voxels. Each voxel represents a value in the voxel grid 150. The bounding box 162 is the smallest volume within which the initial lattice model can be contained and represents the limits of the volume applicable to the topology optimization. An axis-aligned bounding box 162 subjects that the edges of the bounding box are parallel to the coordinate axis of the voxel grid 150.

In step 615, the system computes an implicit scalar field representation 152 of a volume of the initial lattice model. The implicit scalar field representation 152 is an implicit representation of the initial lattice model using a scalar field. The scalar field can be created based on the distance from each point to a closest surface of the initial lattice model. The implicit scalar field representation 152 of the volume within the bounding box can be computed using a distance field.

In step 620, the system maps the loads to their respective locations in the axis-aligned voxel grid 150. The constraint surface locations are also mapped to the corresponding location in the voxel grid 150.

In step 625, the system performs an additive topology optimization on the initial lattice model to create the optimized lattice model until the volume satisfies the volume requirement or the user decides to stop the optimization process. The additive topology optimization locates where material is to be added to the initial lattice structure or intermediate lattice structures in order to maximize the physical objective 176. An additive topology optimization is described in detail below with FIG. 7.

In step 630, the system stores the optimized lattice model. From the implicit volume representation, the optimized structure is extracted as a polygonal mesh using an iso-surfacing technique, such as marching cubes, and is post-processed to improve the lattice structure, such as by using Delaunay methods. The optimized lattice model is then stored for future use in fabrication of the object.

Figure 7:
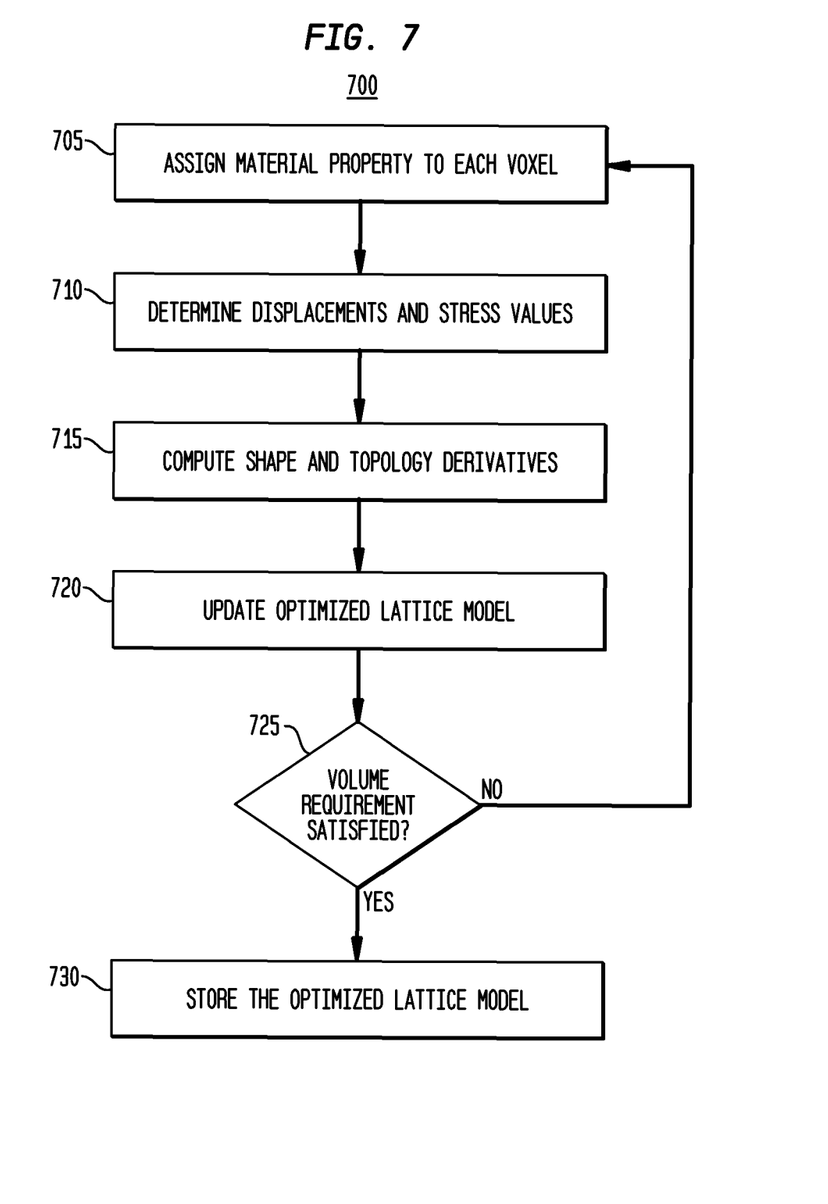
FIG. 7 depicts a flowchart of an additive topology optimization process in accordance with disclosed embodiments that may be performed, for example, by a PLM or PDM system.

FIG. 7 depicts a flowchart of an additive topology optimization process 700 in accordance with disclosed embodiments that may be performed, for example, by a PLM or PDM system.

In step 705, the system assigns a material property 156 to each voxel. The voxels internal to the initial lattice model are identified and assigned an appropriate material property 156 depending on the selected material with which the object is to be manufactured with. Voxels external to the lattice structure are assigned material property value 154 of zero (or a very small number for numerical stability) in order to indicate void regions.

In step 710, the system determines the displacements 164 and stress values 166. A finite element analysis 158 is performed to determine displacements 164 and stress values 166. The finite element analysis 158 calculates the displacements 164 and stress values 166 at each voxel within the bounding box 162 according to the boundary conditions and loads applied. The displacement 164 measures the distance a point in the lattice structure is displaced due to the boundary conditions and applied forces. The stress value measures the amount of stress at a point in the lattice structure due to the boundary conditions and the applied forces.

In step 715, the system computes shape derivatives 170 and topology derivatives 172. Shape derivatives 170 and topology derivatives 172 measure the change of the lattice structure with respect to changes in the shape or topology. The shape derivative 170 and topology derivatives 172 are computed using the displacements 164 and stress values 166 from the FEA results 160. The voxels corresponding to the lattice structures are assigned a shape derivative 170 of zero.

In step 720, the system updates the optimized lattice model. A level-set method 168 can be used to determine the volume of the initial lattice structure where additive material is applied. The level-set method 168 is used to update the lattice region using the shape derivative 170 and topology derivatives 172 as the velocity gradient 174 of the level-set method 168. Renormalization is performed at specified intervals for improved accuracy. The velocity gradient 174 is a measurement in level-set method 168 for the change of surfaces of the lattice structure.

In step 725, the system determines whether the volume requirement is satisfied or the user decides to stop the optimization process. If the volume requirement is not satisfied, the system returns to step 705. If the volume requirement is satisfied, the system proceeds to step 730 and stores the optimized lattice model for extraction and fabrication of the object.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC §112(f) unless the exact words "means for" are followed by a participle.

What is claimed is:

1. A method for structure preserving topology optimization of lattice structures for additive manufacturing, the method performed by a data processing system and comprising:
   receiving an initial lattice model, a physical objective of the initial lattice model to be optimized, forces to be applied to the initial lattice model and their respective locations, and an optimal volume ratio for an optimized lattice model;
   computing a bounding box of the initial lattice model and an axis-aligned voxel grid;
   computing an implicit scalar field representation of an initial volume ratio of the initial lattice model;
   mapping the forces to their respective locations in the axis-aligned voxel grid;
   performing an additive topology optimization on the initial lattice model to create the optimized lattice model until the initial volume ratio satisfies the optimized volume ratio, wherein the additive topology optimization comprises:
   assigning a material property to each voxel in the axis-aligned voxel grid;
   determining displacements and stress values for each of the voxels;
   computing shape derivatives and topology derivatives based on the displacements and stress values for each of the voxels; and
   updating the optimized lattice model using the shape derivatives and topology derivatives; and
   storing the optimized lattice model.

2. The method of claim 1, wherein the voxels corresponding to a lattice structure are assigned a shape derivative of zero.

3. The method of claim 1, wherein assigning the material property comprises assigning the voxels external to the lattice structure with a material property value of zero.

4. The method of claim 1, wherein determining displacements and stress values for each of the voxels comprises performing a finite element analysis.

5. The method of claim 4, wherein the shape derivatives and topology derivatives are computed with results of the finite element analysis.

6. The method of claim 1, wherein updating the optimized lattice model comprising using a level-set method.

7. The method of claim 6, wherein the shape derivatives and topology derivatives are used as a velocity gradient for the level-set method.

8. A data processing system comprising:
   a processor; and
   an accessible memory, the data processing system particularly configured to:
   receive an initial lattice model, a physical objective of the initial lattice model to be optimized, forces to be applied to the initial lattice model and their respective locations, and an optimal volume ratio for an optimized lattice model;
   compute a bounding box of the initial lattice model and an axis-aligned voxel grid;
   compute an implicit scalar field representation of an initial volume ratio of the initial lattice model;
   map the forces to their respective locations in the axis-aligned voxel grid;
   perform an additive topology optimization on the initial lattice model to create an optimized lattice model until the initial volume ratio satisfies the optimized volume ratio, wherein the additive topology optimization comprises:
   assign a material property to each voxel in the axis-aligned voxel grid;
   determine displacements and stress values for each of the voxels;

compute shape derivatives and topology derivatives based on the displacements and stress values for each of the voxels; and update the optimized lattice model using the shape derivatives and topology derivatives; and store the optimized lattice model.

9. The data processing system of claim 8, wherein the voxels corresponding to a lattice structure are assigned a shape derivative of zero.

10. The data processing system of claim 8, wherein to assign the material property comprises assigning the voxels external to the lattice structure with a material property value of zero.

11. The data processing system of claim 8, wherein to determine displacements and stress values for each of the voxels comprises performing a finite element analysis.

12. The data processing system of claim 11, wherein the shape derivatives and topology derivatives are computed with results of the finite element analysis.

13. The data processing system of claim 8, wherein to update the optimized lattice model comprising using a level-set method.

14. The data processing system of claim 13, wherein the shape derivatives and topology derivatives are used as a velocity gradient for the level-set method.

15. A non-transitory computer-readable medium encoded with executable instructions that, when executed, cause one or more data processing systems to:

receive an initial lattice model, a physical objective of the initial lattice model to be optimized, forces to be applied to the initial lattice model and their respective locations, and an optimized volume ratio for an optimized lattice model;

compute a bounding box of the initial lattice model and an axis-aligned voxel grid;

compute an implicit scalar field representation of an initial volume ratio of the initial lattice model;

map the forces to their respective locations in the axis-aligned voxel grid;

perform an additive topology optimization on the initial lattice model to create an optimized lattice model until the initial volume ratio satisfies the optimal volume ratio, wherein the additive topology optimization comprises:

assign a material property to each voxel in the axis-aligned voxel grid;

determine displacements and stress values for each of the voxels;

compute shape derivatives and topology derivatives based on the displacements and stress values for each of the voxels; and update the optimized lattice model using the shape derivatives and topology derivatives; and store the optimized lattice model.

16. The computer-readable medium of claim 15, wherein to assign the material property comprises assigning the voxels external to the lattice structure with a material property value of zero.

17. The computer-readable medium of claim 15, wherein to determine displacements and stress values for each of the voxels comprises performing a finite element analysis.

18. The computer-readable medium of claim 17, wherein the shape derivatives and topology derivatives are computed with results of the finite element analysis.

19. The computer-readable medium of claim 15, wherein to update the optimized lattice model comprising using a level-set method.

20. The computer-readable medium of claim 19, wherein the shape derivatives and topology derivatives are used as a velocity gradient for the level-set method.

* * * * *